United States Patent
Garcia Rodriguez et al.

(10) Patent No.: US 12,311,841 B2
(45) Date of Patent: May 27, 2025

(54) SYSTEMS AND METHODS FOR REAR PASSENGER ATTENTION ATTRACTION

(71) Applicant: Ford Global Technologies, LLC, Dearborn, MI (US)

(72) Inventors: Gonzalo Gabino Garcia Rodriguez, Tlalpan (MX); Jose Martin Mandujano Salgado, Cocoyoc (MX); Ibaruch Diego Barcenas Jimenez, Cuautitlan Izcalli (MX); Jose Martin Gonzalez Pino, Nicolas Romero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 18/182,884

(22) Filed: Mar. 13, 2023

(65) Prior Publication Data

US 2024/0308425 A1    Sep. 19, 2024

(51) Int. Cl.
| | | |
|---|---|---|
| *B60Q 3/70* | (2017.01) | |
| *B60Q 3/54* | (2017.01) | |
| *B60Q 3/82* | (2017.01) | |
| *G08B 5/36* | (2006.01) | |

(52) U.S. Cl.
CPC ............ *B60Q 3/70* (2017.02); *B60Q 3/54* (2017.02); *B60Q 3/82* (2017.02); *G08B 5/36* (2013.01)

(58) Field of Classification Search
CPC ... B60Q 3/70; B60Q 3/54; B60Q 3/82; G08B 5/36; G08B 5/38; G08B 5/00; B60K 35/656; B60K 35/10; B60K 35/28; B60K 2360/113; B60K 2360/1438; B60K 2360/1468
See application file for complete search history.

(56) References Cited

U.S. PATENT DOCUMENTS

| | | | |
|---|---|---|---|
| 9,522,631 B2 | 12/2016 | Kleinert et al. | |
| 10,261,672 B1* | 4/2019 | Dolbakian | G06F 3/04883 |
| 10,654,489 B2 | 5/2020 | Tertoolen et al. | |
| 2003/0063756 A1* | 4/2003 | Geerlings | H04R 5/02 |
| | | | 381/86 |
| 2004/0207762 A1* | 10/2004 | Spinelli | H04R 5/02 |
| | | | 348/705 |
| 2012/0013548 A1 | 1/2012 | Choi et al. | |
| 2014/0032098 A1 | 1/2014 | Anderson | |
| 2015/0131303 A1* | 5/2015 | Lim | B60Q 3/47 |
| | | | 362/488 |

OTHER PUBLICATIONS

Elektrobit, Human Machine Interface Enhancing the Driving Experience, 2011-2022, 1-6.
Anshul Saxena, How Automotive HMI Solutions are Transforming In-Vehicle Experiences, Nov. 29, 2022.

* cited by examiner

*Primary Examiner* — Brian Wilson
(74) *Attorney, Agent, or Firm* — Joseph Zane; Eversheds Sutherland (US) LLP (57) ABSTRACT

Systems and methods for implementing rear passenger attention. A driver of a vehicle may be presented with a graphical interface for controlling a telltale embedded in a rear region of the vehicle that is visible to other occupants of the vehicle (e.g., rear passengers). The driver may access an edge bar on the graphical interface to activate the telltale. The telltale may be activated to attract the attention of other occupant(s) of the vehicle (e.g., rear passengers) by pulsing at a 1 Hz frequency with an integrated dimming function that reduces the effects of epilepsy.

17 Claims, 7 Drawing Sheets

SYSTEMS AND METHODS FOR REAR PASSENGER ATTENTION ATTRACTION

BACKGROUND

Passengers of a vehicle will oftentimes have a mobile device such as a smartphone, tablet, or other handheld device with which they can browse the Internet, play music, watch a movie or television show, video conference friends and family, and so on and so forth. While the convenience of being able to use these mobile devices is often times enriching to the user, it can also pose a challenge for others that wish to attract the attention of the mobile device user. Children and teens tend to be immersed in electronic devices while traveling inside the vehicle, and may be distracted while using such devices. Drivers wishing to gain the attention of passengers in the rear of the vehicle are increasing finding it difficult to attract the attention of the rear passengers as the use of mobile devices becomes more and more prevalent.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for rear passenger attention attraction using a telltale optical signal. Techniques described herein may be utilized to allow for a driver of a vehicle to more effectively interact with passengers in the rear of the vehicle.

A telltale embedded in a rear region of a vehicle may be used to attract the attention of passengers in the rear of the vehicle, who may sometimes be distracted or preoccupied. As the capability of mobile devices and wireless networks expand, passengers of a vehicle have growing opportunities to browse the Internet, play music, watch a movie or television show, video conference friends and family, and engage in various other forms digital activities in the comfort of a vehicle. While the convenience of being able to use these mobile devices is often times enriching to the user, it can also pose a challenge for others that wish to attract the attention of the mobile device user. Children and teens tend to be immersed in electronic devices while traveling inside the vehicle, and may be distracted while using such devices. Drivers wishing to gain the attention of passengers in the rear of the vehicle are increasing finding it difficult to attract the attention of the rear passengers without assistance.

Accordingly, it should be appreciated that there is a present need for drivers to be able to attract the attention of the rear passengers without requiring undue effort or attention by the driver.

In at least one embodiment of the present disclosure, a telltale is a visual indicator situated in the rear center console of a vehicle that can be activated by the driver via a human machine interface (HMI) to attract the attention of the rear passengers. As an illustrative, non-limiting example, a driver may perform a sequence of short and easy to perform gestures within the HMI's graphical interface to activate the telltale that involves accessing an edge bar and then pressing a button (e.g., soft button) to activate the telltale located in the rear of the vehicle. The telltale may be in communication with the HMI and, in response to the activation signal, pulse at a 1 Hz frequency with an integrated dimming function that reduces the effects of epilepsy. In various embodiments, the telltale is situated in a central location that is in the view of the vehicle's rear passengers. The distinctive pulsing pattern will, accordingly, be easily seen by rear passengers of the vehicle and attract the rear passengers' attention.

As described in greater detail below, various embodiments of the present disclosure may be utilized to implement techniques for attracting rear passenger attention. In at least one embodiment, a vehicle, comprises a telltale embedded in a rear region of the vehicle that is visible from at least one rear passenger seat of the vehicle; a human-machine interface (HMI) accessible to a first user of the vehicle, the HMI comprising a touchscreen; and a controller system comprising one or more processors and memory storing executable instructions that, as a result of execution by the one or more processors, causes the controller system to implement various functionality for rear passenger attention attraction. In addition, the HMI may include an image sensor (e.g., a camera) that is able to receive user input via gestures made by the user's hand, essentially the same inputs described herein for activating or deactivating the telltale.

According to at least one embodiment, the controller system will present a graphical interface to the first user of the vehicle using the HMI, wherein the graphical interface comprises an edge bar; determine that the first user has accessed the edge bar; determine that the first user has selected a telltale activation icon from the edge bar; and submit a command to activate the telltale and attract attention of a second user in the rear passenger seat of the vehicle.

According to at least one embodiment, a first user (e.g., driver) accesses an edge bar by a swipe gesture from an edge of the touchscreen inward. The swipe gesture may be performed on the edge of a touchscreen where a collapsed edge bar is located.

In at least one embodiment, the telltale is activated to pulse at a fixed frequency (e.g., 1 hertz). The telltale may be configurable to pulse at various frequencies or various patterns that are designed to more effectively attract the attention of human passengers.

In various embodiment, the telltale has an integrated dimming function to reduce the effects of epilepsy.

In various embodiments, the telltale is embedded in a rear center console of the vehicle.

In various embodiments, the controller system is further configured to: present, via the graphical interface, a prompt indicating that the telltale is activated; detect, via the touchscreen, that the first user has tapped the touchscreen subsequent to activation of the telltale; and submit a second command to deactivate the telltale.

In various embodiments, the vehicle is designed with multiple telltales located throughout the vehicle, which can be designed to attract the attention of different passengers throughout a vehicle. Additional telltales may be embedded throughout the vehicle and the graphical interface may provide the driver with an ability to selectively activate each of the telltales. For example, a three-row vehicle may comprise a first telltale embedded between the first and second rows of the vehicle for attracting the attention of passengers seated in the middle row, and may further comprise a second telltale embedded between the second and third rows of the vehicle for attracting the attention of passengers in the back row.

Figure 1:
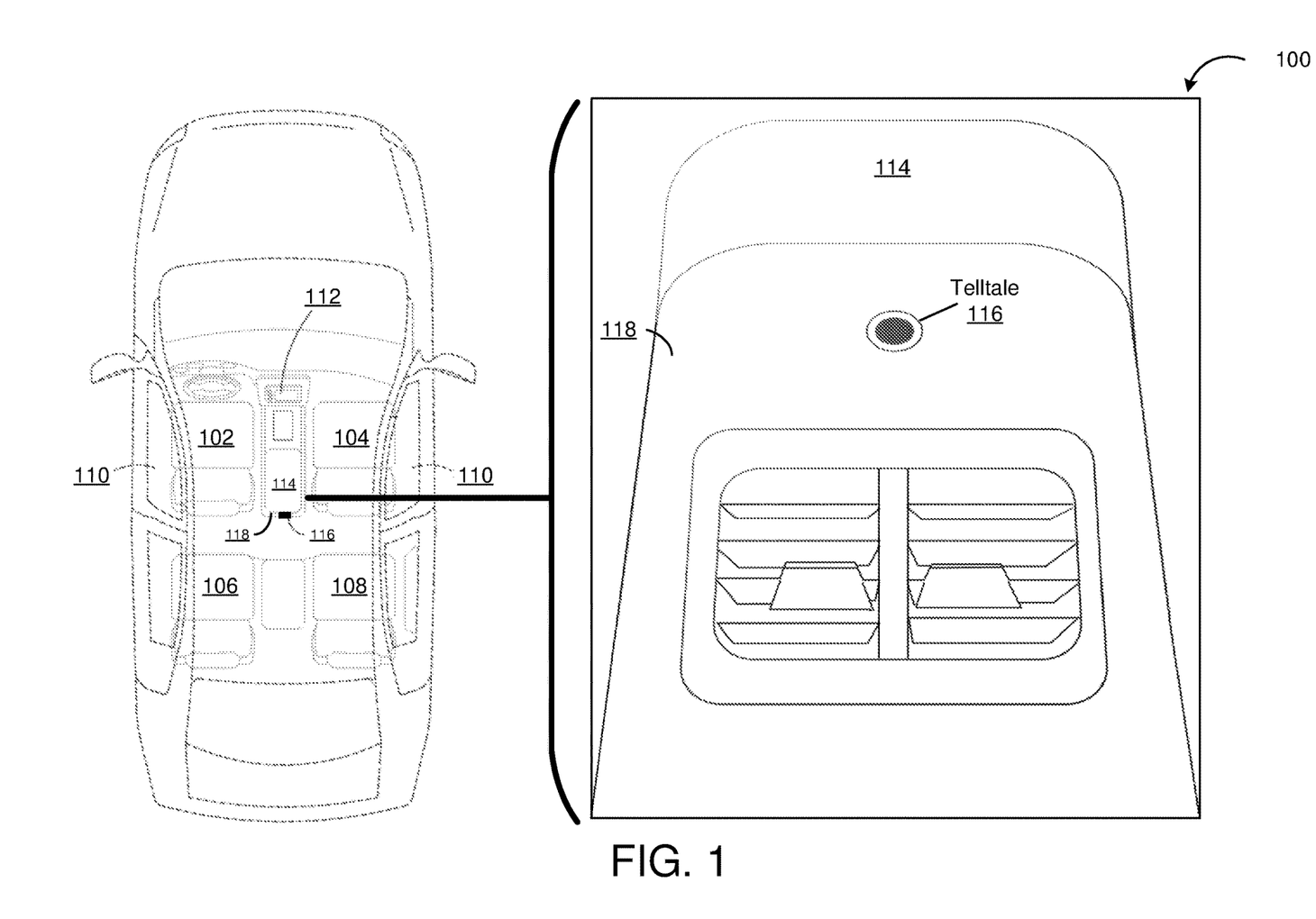
FIG. 1 illustrates an example of a vehicle 100 in which various techniques for rear passenger attention attraction may be implanted using an embedded telltale in the rear of the vehicle, according to at least one embodiment.

Referring to FIG. 1, the left-hand portion of FIG. 1 illustrates a top-down view of the interior of an automotive vehicle 100. A non-limiting, illustrative example of vehicle 100 generally includes a seating arrangement including a front driver seat 102, front passenger seat 104 and two rear passenger seats 106 and 108, each adapted to seat a person as an occupant in passenger compartment of the vehicle 100. In various embodiments, vehicle 100 is designed with a rear center console 118 with storage compartment 114 disposed between front driver seat 102 and front passenger seat 104, and side door armrests 110.

Vehicle 100 may have a front center console in which various controls are integrated. In various embodiments, a vehicle 100 comprises an in-vehicle infotainment (IVI) system that implements a human-machine interface 112. In various embodiments, the human-machine interface 112 includes a touchscreen configured to display information to a user and allow the user to provide inputs by touching the touchscreen. While a touchscreen described herein, this disclosure is not limited to touchscreens, and extends to other types of displays and human-machine interfaces and a user may interact with the HMI 112 and that the user may also interact with the HMI through physical buttons, voice commands, augmented reality (AR) tools, camera-based commands, and more.

Among other functions, the IVI is configured to present visual representations of a human-machine interface 112. In FIG. 1, for example, interfaces such as those described in connection with FIG. 3 and FIG. 4 may be shown in the center console in a manner which is convenient for the driver to view and/or interact with.

The in-vehicle infotainment system may be used to provide an interface by which a driver can attract the attention of rear passengers in the car (e.g., seated in the rear passenger seats 106 and 108). In various embodiments, the HMI 112 comprises an edge bar that is always in front (e.g., always visible, regardless of what application is running on the vehicle) and a driver can access the edge bar menu by performing a swipe gesture from a side of the HMI inwards to access an edge bar menu, where the driver can then tap a button to activate a telltale situated at the rear of the vehicle.

The telltale may be implemented at least in part as a light emitting diode (LED) situated in the rear center console 118 of the vehicle that pulses at a fixed frequency (e.g., 1 hertz) and may include a dimming feature. Once the telltale has been activated, the driver may have the ability to deactivate the telltale if the rear passenger has noticed the telltale, or may provide commands to the vehicle to continue pulsing the telltale if the rear passenger's attention has not yet been attracted.

Turning to the right-hand portion of FIG. 1, another view of the rear center console 118 is shown, this time a back-to-front view of the rear center console 118. In various embodiments, the rear center console of the vehicle has integrated features such as vents and knobs for climate control, cup holders, and more. As seen in the right-hand portion of FIG. 1, the rear center console 118 may have an integrated telltale 116. The telltale may be a light emitting diode (LED) or other suitable lighting element that can provide various types of optical signaling. For example, the LED may be configurable to pulse at fixed or variable frequencies, at various brightness values, support dimming capabilities, and so on and so forth. Telltale 116 may be controlled by circuitry that is in communication (e.g., wirelessly) with a controller system of the vehicle. For example, the controller system may be operable to receive commands from a driver of the vehicle via a HMI to activate or deactivate the telltale.

While a telltale 116 has been depicted in FIG. 1 (left-hand and right-hand portions) as being integrated into the center of the rear center console, there are various other embodiments in which the telltale may be placed in other locations. For example, in some embodiments a telltale may be located in front of both the two rear passenger seats 106 and 108, this may allow for the driver to activate one telltale, the other telltale, or both simultaneously. In various embodiments, the telltale is implemented as any suitable visual indicator that can be used to attract the attention of rear passengers. The telltale 116 may be implemented as a SMD LED of blue color that will blink at a fixed frequency (e.g., 1 hertz) with an integrated dimming function. Dimming functionality may be advantageous as it has the capability to reduce the effects of epilepsy in response to the blinking.

In various embodiments, the telltale 116 is configured to blink at variable frequencies. For example, the telltale 116 may blink at infrequent intervals, such as a fast blink-fast blink-slow blink cadence. The telltale 116 may be configured or programmable to emit any suitable light pattern, for example, a pattern that is more likely to attract the attention of passengers that may be otherwise distracted by mobile devices or other digital screens.

Figure 2:
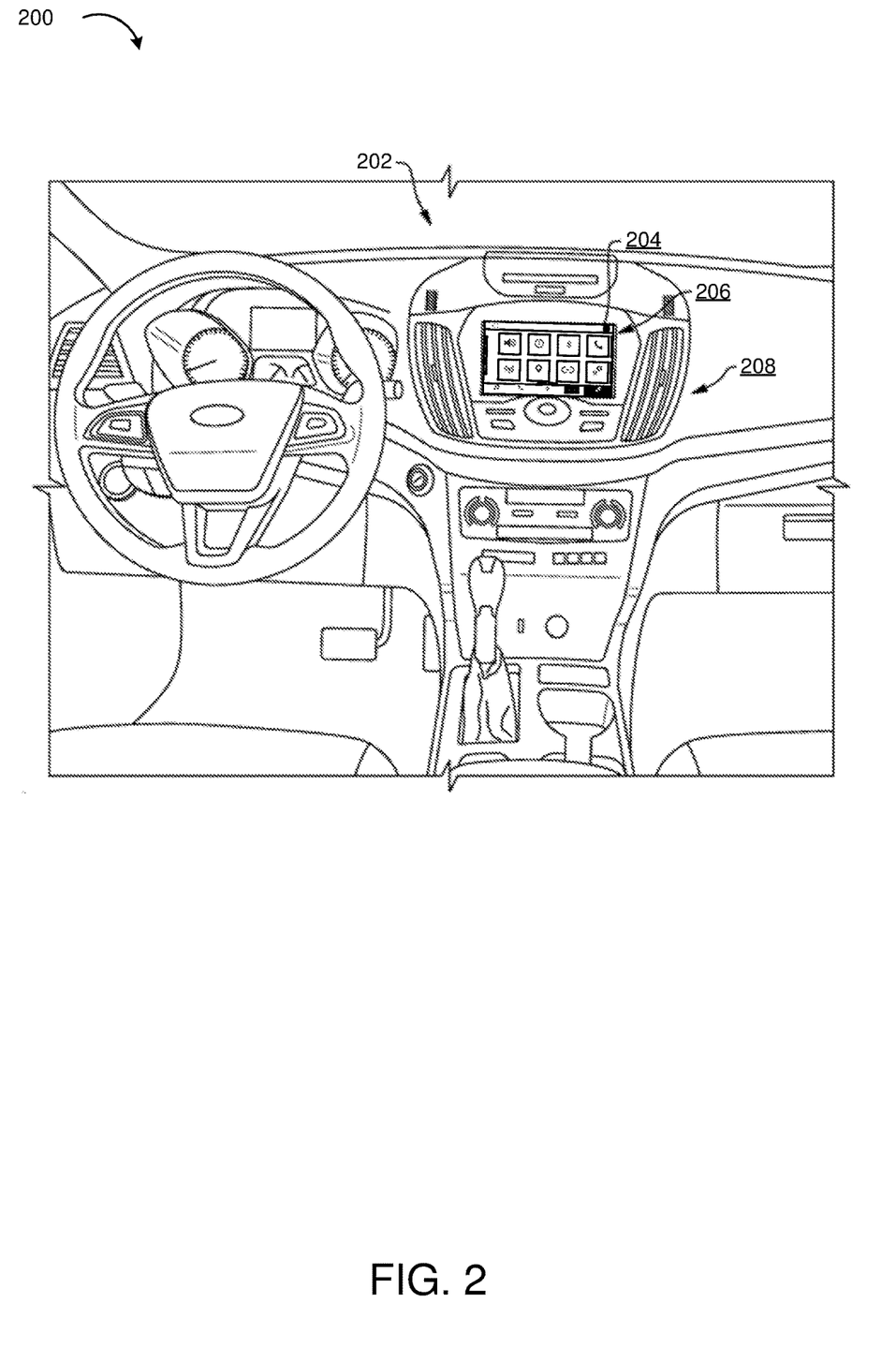
FIG. 2 illustrates an illustration with an example vehicle cabin and, in particular, illustrates an in-vehicle infotainment (IVI) system.

FIG. 2 illustrates an illustration 200 with an example vehicle cabin 202 and, in particular, illustrates an in-vehicle infotainment (IVI) system 208. The in-vehicle infotainment system 208 includes the human-machine interface 206. The human-machine interface 206 includes a touchscreen 204 configured to display information to a user and allow the user to provide inputs by touching the touchscreen 204. While a touchscreen 204 is shown and described herein, this disclosure is not limited to touchscreens, and extends to other types of displays, human-machine interfaces, a microphone for receiving voice-commands, a button on a steering wheel, a camera to detect hand gestures, etc.

Among other functions, the controller system is configured to present visual representations of a human-machine interface 206. In FIG. 2, for example, graphical interface with an edge bar is shown. This graphical interface is described in greater detail below in connection with FIGS.

3-5. Examples of different graphical interfaces that may be presented on human-machine interface 206 are described in connection with FIGS. 3-6.

The in-vehicle infotainment system 208 may be used to control the operation of a telltale to attract the attention of one or more occupants of the vehicle user via human-machine interface 206 or other types of interfaces, such as the vehicle's dashboard or instrument cluster (IC), or externally, for example, by communicating such information to a user's smartphone via a mobile application.

A controller system may be referred or may implement an interface engine or other interface state systems as described herein. For example, processes described in accordance with FIG. 6 may be implemented at least in part using the controller system. The controller system is configured to determine a graphical interface that can be used to control a telltale visual indicator situated in the rear of the vehicle. The controller system may be utilized to communicate with a telltale or other means of visual indication that within the state of the art and activate, deactivate, or otherwise configure the behavior of such means.

Figure 3:
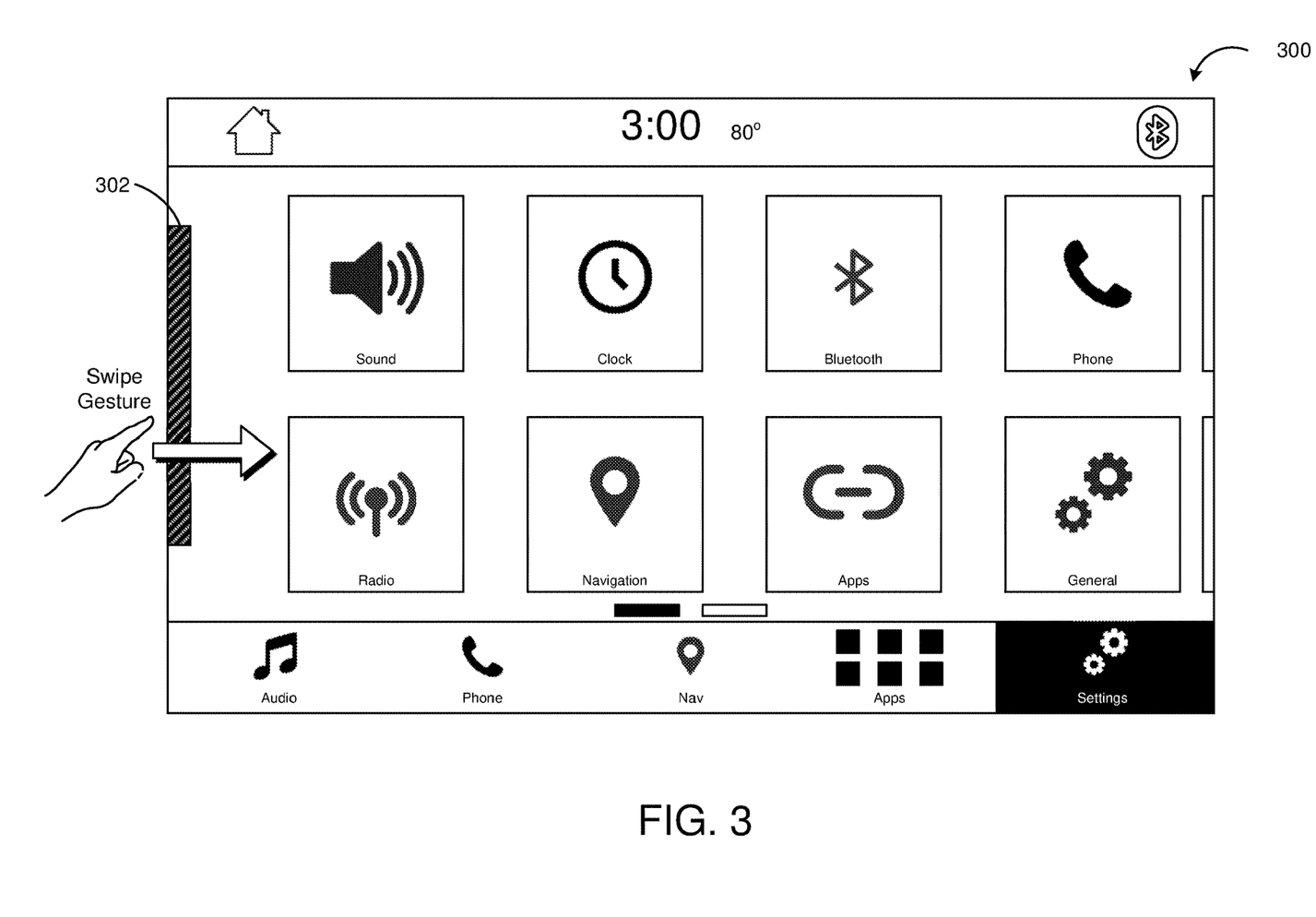
FIG. 3 illustrates a graphical interface 300 with a collapsed edge bar, according to at least one embodiment of the present disclosure.

FIG. 3 illustrates a graphical interface 300 with a collapsed edge bar, according to at least one embodiment of the present disclosure.

In at least one embodiment, graphical interface 300 refers to a graphical interface that is implemented in the context of FIG. 2. Graphical interface 300 may be implemented in the context of an in-vehicle infotainment system (IVI) that includes a human-machine interface. In various embodiments, the human-machine interface includes a touchscreen configured to display information to a user and allow the user to provide inputs by touching the touchscreen to control functionality of the vehicle, for example, through a series of graphical interfaces such as those described in connection with FIGS. 3-5. While a touchscreen is shown and described herein, this disclosure is not limited to touchscreens, and extends to other types of displays and human-machine interfaces.

In various embodiments, an in-vehicle infotainment system comprises a human-machine interface and a touchscreen by which a driver or passenger in the front of the vehicle can activate a telltale located in the rear of the vehicle to attract the attention of occupants in the rear of the vehicle. While "front" and "rear" are terms utilized in this disclosure, these can more generally be considered distinct regions of a vehicle and the embodiments contemplated in the scope of this disclosure are not so limited by the relative location of a first occupant interacting with a HMI and a second occupant whose attention is being sought through the use of a telltale or other visual indicator.

Returning to FIG. 3, graphical interface 300 may present various different visual elements to the driver or other occupants of the vehicle. Graphical interface 300 may comprise various icons, such as a Sound icon for adjusting the sound volume for music, radio, podcasts, etc. that may be played using the vehicle's speaker systems, a Clock icon for viewing the time, setting an alarm, or other time-related tasks, Bluetooth☐ icon for connecting to Bluetooth-enabled device, a Phone icon for making hands-free phone calls through the vehicle's on-board systems, a Radio icon for controlling the vehicle's on-board radio systems (e.g., FM, AM, or satellite radio), a Navigation icon for setting a navigation path for setting a travel route, an Apps icon for accessing third-party applications, a General icon for accessing settings or various other configuration options of the vehicle, and so on and so forth. The graphical interface 300 may furthermore display other icons, such as time and temperature information along a top bar of the vehicle, Bluetooth connectivity information, as well as easily accessible shortcuts along the bottom of the graphical interface 300 that allow the user to quickly access commonly used icons.

In various embodiments, graphical interface 300 comprises a collapsed edge bar 302 that can be used to activate, deactivate, or otherwise control operation of a telltale for attracting the attention of rear passengers of the vehicle. While FIG. 3 depicts the collapsed edge bar 302 on the left-edge of the screen, it can be located along any border of the graphical interface, for example, on the right-edge, top-edge, or bottom-edge of the graphical interface 300. In some embodiments, the telltale can instead or additionally be accessed as an additional icon of the graphical interface.

Collapsed edge bar 302 may refer to an element of graphical interface 300 that is occupies a small, edge-portion of the graphical interface 300, for example, on the left-edge of graphical interface 300 as depicted in FIG. 3. The driver or other users of the vehicle may interact with the collapsed edge bar 302 through a swipe gesture. For example, in FIG. 3, a user may perform a left-to-right swipe gesture starting from the left-edge of a touchscreen to expand the collapsed edge bar 302. By performing this action, the user can expand the edge bar to surface additional functionality, such as the ability to control a telltale. Upon performing the swipe gesture, an expanded edge bar interface element may be presented to the user, which is described in greater detail in connection with FIG. 4 below.

Collapsed edge bar 302 may be characterized as being always-on-top, meaning that the collapsed edge bar 302 is accessible even when there is an active application. For example, if the user taps on the Navigation icon, a navigation application may be launched and display the local maps information, interfaces for specifying a routing, and so on and so forth. Additionally, the edge bar may be present and "on top" of the navigation application, so that the user may still perform the same swipe gesture on the left-edge of the screen (e.g., as described above) to access the expanded edge bar. The expanded edge bar may be implemented in the context of FIG. 4, described in greater detail below.

Figure 4:
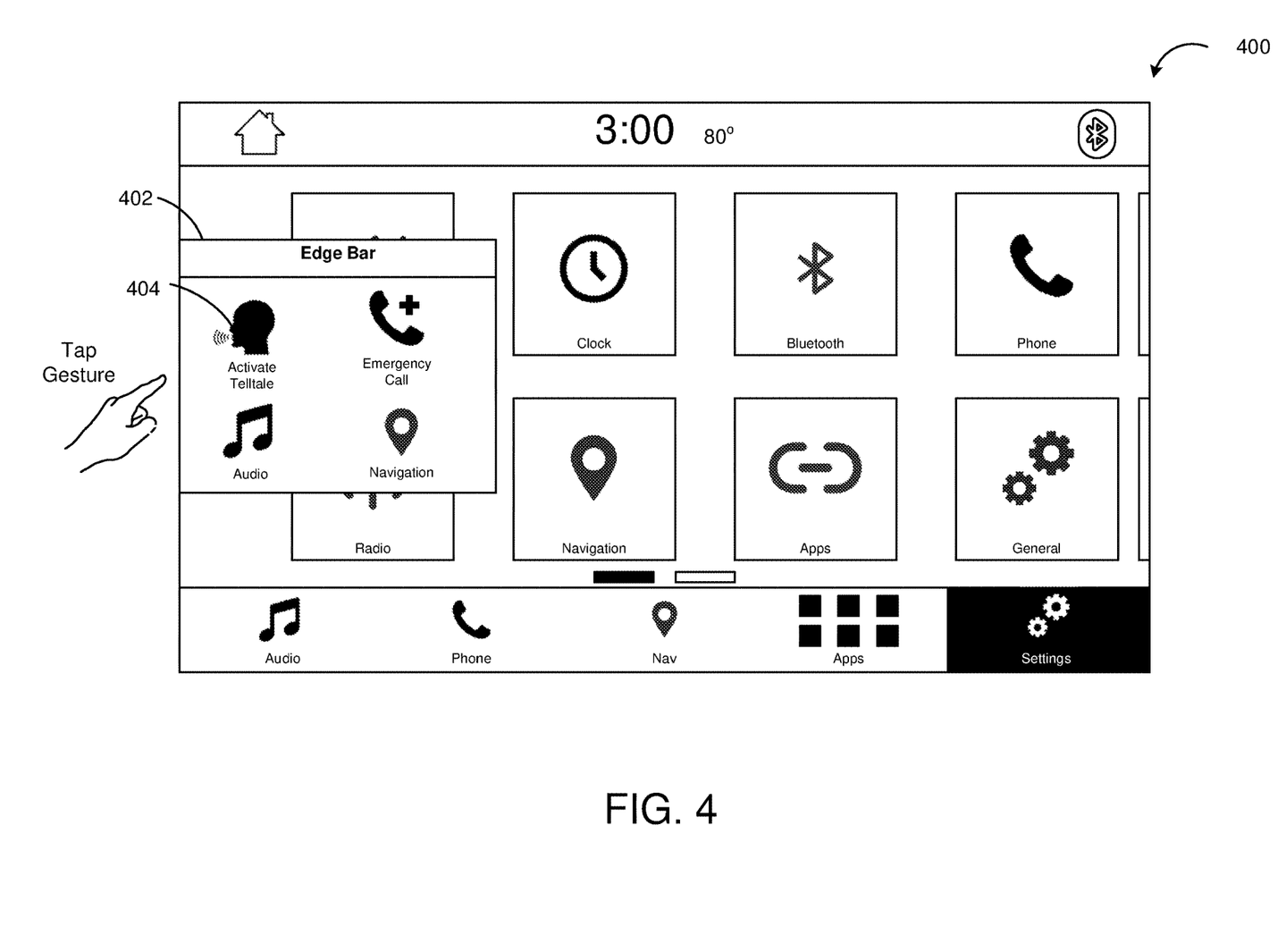
FIG. 4 illustrates a graphical interface 400 with an expanded edge bar, according to at least one embodiment of the present disclosure.

FIG. 4 illustrates a graphical interface 400 with an expanded edge bar, according to at least one embodiment of the present disclosure.

In at least one embodiment, graphical interface 400 refers to a graphical interface that is implemented in the context of FIG. 2. Graphical interface 400 may be implemented in the context of an in-vehicle infotainment system (IVI) that includes a human-machine interface. In various embodiments, the human-machine interface includes a touchscreen configured to display information to a user and allow the user to provide inputs by touching the touchscreen to control functionality of the vehicle, for example, through a series of graphical interfaces such as those described in connection with FIGS. 3-5. While a touchscreen is shown and described herein, this disclosure is not limited to touchscreens, and extends to other types of displays and human-machine interfaces.

In various embodiments, an in-vehicle infotainment system comprises a human-machine interface and a touchscreen by which a driver or passenger in the front of the vehicle can activate a telltale located in the rear of the vehicle to attract the attention of occupants in the rear of the vehicle. While "front" and "rear" are terms utilized in this disclosure, these can more generally be considered distinct regions of a vehicle and the embodiments contemplated in the scope of this disclosure are not so limited by the relative location of a first occupant interacting with a HMI and a second occupant whose attention is being sought through the use of a telltale or other visual indicator.

Returning to FIG. 4, graphical interface 400 is an example interface in which an expanded edge bar 402 is presented to a user. For example, the edge bar may, by default, be in a collapsed mode (e.g., prior to the user interacting with the edge bar) and may be expanded through a swipe gesture, in accordance with embodiments described in connection with FIG. 3. Expanded edge bar 402 may slide out from the edge of the screen when a user (e.g., driver) performs a swipe gesture from the edge of the touchscreen inward. For example, in FIG. 4, the swipe gesture may be left-to-right starting at or near the left-edge of the touchscreen in which graphical interface 400 is presented. Expanded edge bar 402 may be presented in response to the user's swipe gesture. In various embodiments, the user can collapse or dismiss the expanded edge bar 402 by tapping on any other region of the screen outside of the edge bar.

Expanded edge bar 402 may present the user with one or more icons that can be accessed through a tap gesture. For example, the expanded edge bar 402 depicted in FIG. 4 comprises a telltale icon 404 that can be used to activate the telltale. Upon activation, the in-vehicle infotainment system hosting the graphical interface 400 may send a command to activate a telltale located in the rear of the vehicle, for example, embedded in the rear center console of the vehicle. When the user (e.g., driver) activates the telltale, the graphical interface 400 may be updated to provide the user with mechanisms for controlling the telltale—for example, to deactivate the telltale if the rear passenger's attention has been attracted, or to continue pulsing the telltale if the rear passenger's attention is still being sought. The updated graphical interface when the telltale icon has been pressed may be implemented in accordance with embodiments discussed in connection with FIG. 5.

In various embodiments, the expanded edge bar 402 is a customizable interface element where the vehicle's user can select one or more shortcuts to be shown. For example, in FIG. 4, the user has direct access to multiple applications via the expanded edge bar 402—activate telltale, emergency call, audio, and navigation. These can be configured by users based on their personal preferences.

Figure 5:
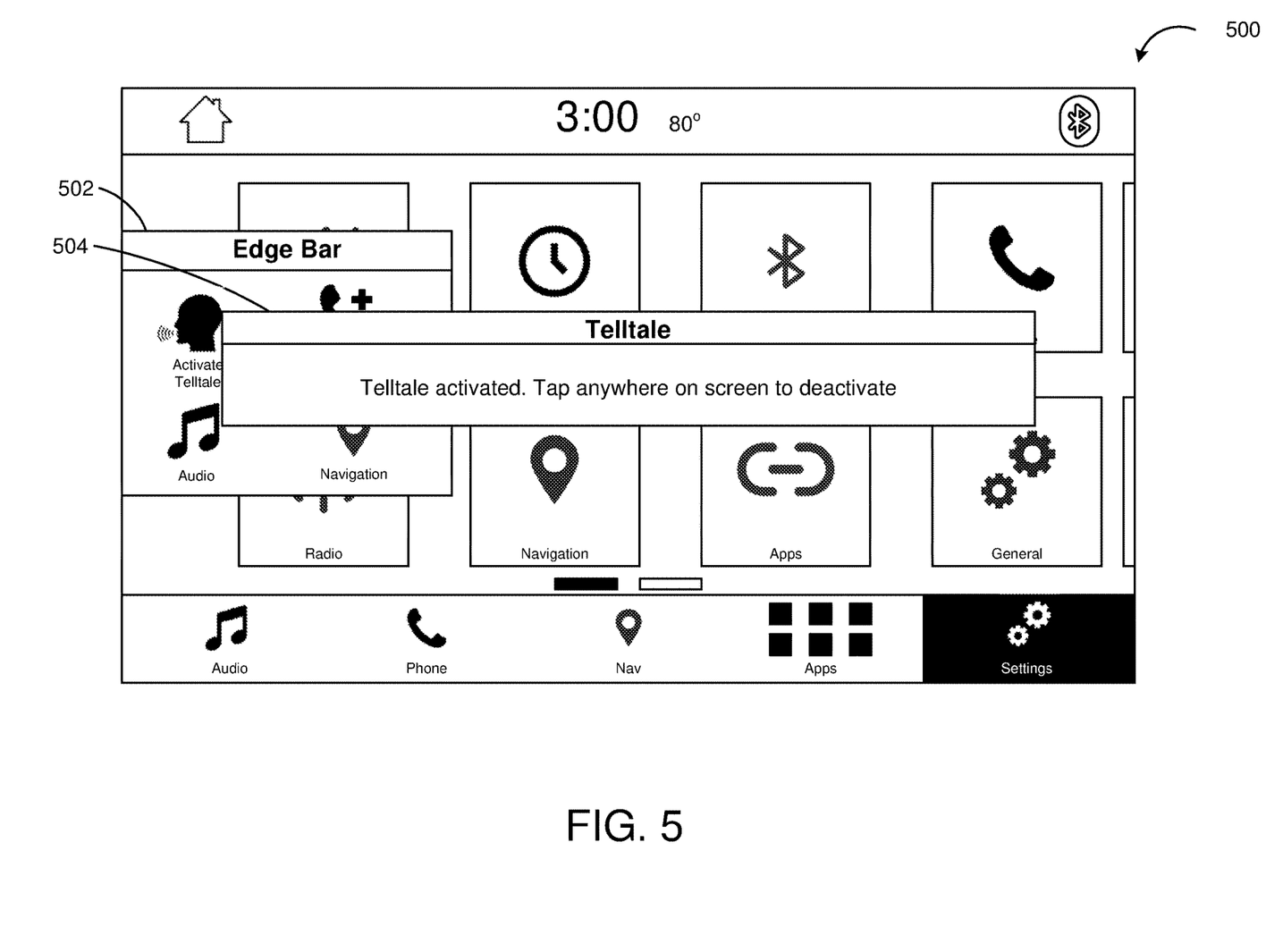
FIG. 5 illustrates a graphical interface 500 for controlling activation/deactivation of a rear passenger telltale, according to at least one embodiment of the present disclosure.

FIG. 5 illustrates a graphical interface 500 for controlling activation/deactivation of a rear passenger telltale, according to at least one embodiment of the present disclosure.

In at least one embodiment, graphical interface 500 refers to a graphical interface that is implemented in the context of FIG. 2. Graphical interface 500 may be implemented in the context of an in-vehicle infotainment system (IVI) that includes a human-machine interface. In various embodiments, the human-machine interface includes a touchscreen configured to display information to a user and allow the user to provide inputs by touching the touchscreen to control functionality of the vehicle, for example, through a series of graphical interfaces such as those described in connection with FIGS. 3-5. While a touchscreen is shown and described herein, this disclosure is not limited to touchscreens, and extends to other types of displays and human-machine interfaces.

In various embodiments, an in-vehicle infotainment system comprises a human-machine interface and a touchscreen by which a driver or passenger in the front of the vehicle can activate a telltale located in the rear of the vehicle to attract the attention of occupants in the rear of the vehicle. While "front" and "rear" are terms utilized in this disclosure, these can more generally be considered distinct regions of a vehicle and the embodiments contemplated in the scope of this disclosure are not so limited by the relative location of a first occupant interacting with a HMI and a second occupant whose attention is being sought through the use of a telltale or other visual indicator.

Returning to FIG. 5, graphical interface 500 is an example interface in which a user (e.g., driver) has activated a telltale via a HMI, according to at least one embodiment of the present disclosure. The driver of a vehicle may activate the telltale by accessing the edge bar 502 of a graphical interface of the in-vehicle infotainment system and selecting the icon for activating the telltale. In various embodiments, when the user taps on the telltale icon (e.g., as discussed in connection with FIG. 4), a telltale located in the rear of the vehicle is activated and provides a visual indicator to the rear passengers of the vehicle. In addition to activating the telltale, the graphical interface 500 may be updated to present a prompt 504 that indicates that the telltale is activated. This prompt 504 may be used to provide the driver an indicator that the telltale is activated and that the rear passenger(s) attention is being sought. The prompt 504 may be used as a mechanism to deactivate the telltale. For example, the telltale may be embedded into the rear center console of the vehicle and is expected to be activated by the user through the HMI, which will lead up to the activation of the telltale for a fixed duration (e.g., 5 seconds). In various embodiments, the flashing/fading telltale will remain active until the driver no longer needs the feature. The driver may provide an indication that the telltale is no longer needed by touching the screen to dismiss the telltale. Dismissing the telltale may cause the telltale to be deactivated, and the graphical interface may return to a "Home" screen or otherwise dismiss the prompt 504.

Figure 6:
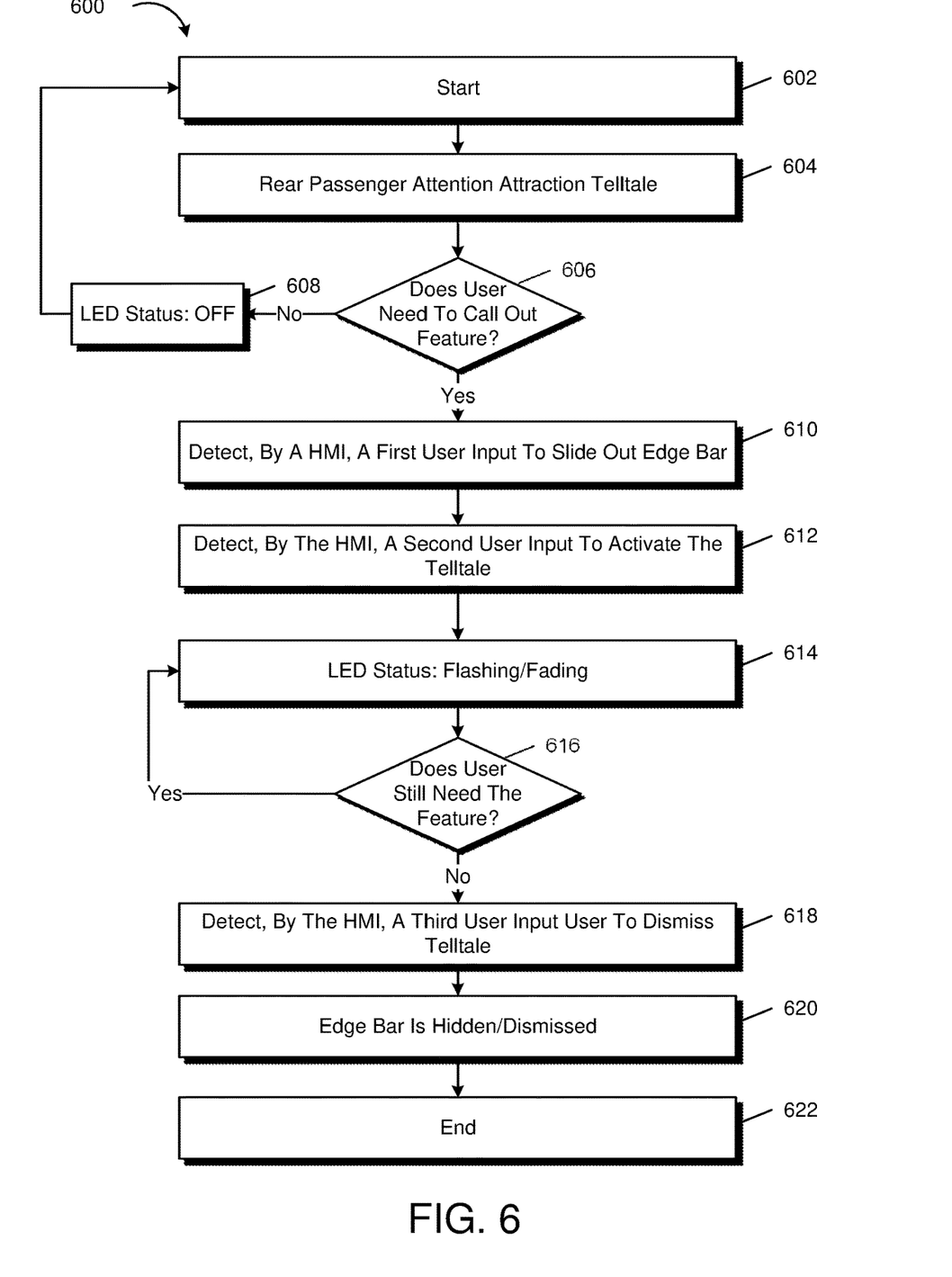
FIG. 6 shows an illustrative example of a process for rear passenger attention attraction, in accordance with one or more example embodiments of the present disclosure.

FIG. 6 shows an illustrative example of a process 600 for rear passenger attention attraction, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5. In at least one embodiment, process 600 or a portion thereof is collectively implemented by a controller system of a vehicle.

In various embodiments, process 600 is initialized at step 602 and proceeds to step 604. In various embodiments, rear passenger attention attraction telltale is embedded in a vehicle's rear center console. In various embodiments, there may be multiple telltales located throughout a vehicle, for example, in the case where a vehicle has three rows, the second and third rows of the vehicle (e.g., passenger rows) may each have a telltale located in front of the passengers (e.g., at the nearest center console) such that it is easily seen by the passengers in the respective rows.

In various embodiments, process 600 proceeds to step 606, where it is determined whether a user (e.g., driver of the vehicle) needs to call out the feature. The driver may determine, at some point while driving, that he or she needs to attract the attention of another passenger that is located in the rear of the vehicle (or more generally, in a different region of the vehicle). If the driver does not need to attract the attention of other occupants of the vehicle, then the process may proceed to step 608 and continue to step 602, continuing to operate as usual until the call out feature is needed. When the telltale signaling is needed, process 600 proceeds to step 610 where HMI detects a first user input to slide out an edge bar. In various embodiments, the user (e.g., driver) performs a sliding or swiping gesture from the side of a touchscreen to expand the edge bar. The edge bar may be in a collapsed mode by default, and the user sliding out the edge bar may expand the edge bar to present a group of applications that can be quick-launched from the edge bar. Process 600 may proceed to step 612 where the HMI detects a second user input to activate the telltale. As referenced above, a user may expand the edge bar through a sliding or swiping gesture to reveal an expanded edge bar, which may include various icons that the user may tap. Among these icons, there may be an "Activate Telltale" icon which the user can tap to activate the function of the telltale. For example, there may be an "Activate Telltale" icon in the edge bar, as described in connection with FIG. 4.

Continuing with process 600, when the user taps the icon for the telltale, a controller system of the vehicle may send a command (e.g., wirelessly) to a telltale embedded in another region of the vehicle to attract the attention of another occupant. For example, the telltale may be embedded in the rear center console of a sedan vehicle, which is visible to occupants in any of the rear passenger seats. At step 614, the status of the telltale is flashing/fading as a result of being activated through the HMI icon(s). In various embodiments, the telltale pulses at a fixed frequency (e.g., 1 hertz). In various embodiments, the telltale has an integrated dimming function that reduces the effects of epilepsy. In various embodiments, the telltale is a blue LED.

When the telltale is activated, the HMI may continue to check whether the user still needs the feature. This may be done in a variety of ways. For example, the user may be required to confirm that the telltale is still needed at certain intervals (e.g., 30 seconds) and the telltale is automatically deactivated without an affirmative response from the user.

At step 618, the system detects, by the HMI, a third user input to dismiss the telltale. In various embodiments, the user tapping the touchscreen subsequent to activation of the telltale may be taken as an indication to dismiss the telltale, according to at least some embodiments. In response to the user touching the screen, process 600 may proceed to step 620 to hide or dismiss the edge bar, for example, by returning to a "Home" screen or the previous screen that the user had been using prior to activating the telltale. Additionally, the telltale may be deactivated so that the LED status is off. Upon doing so, process 600 may be completed and proceed to the end 622. This process may be repeated or performed again at a later point in time, for example, if the driver needs the attention of a rear passenger again at a later point in time.

Figure 7:
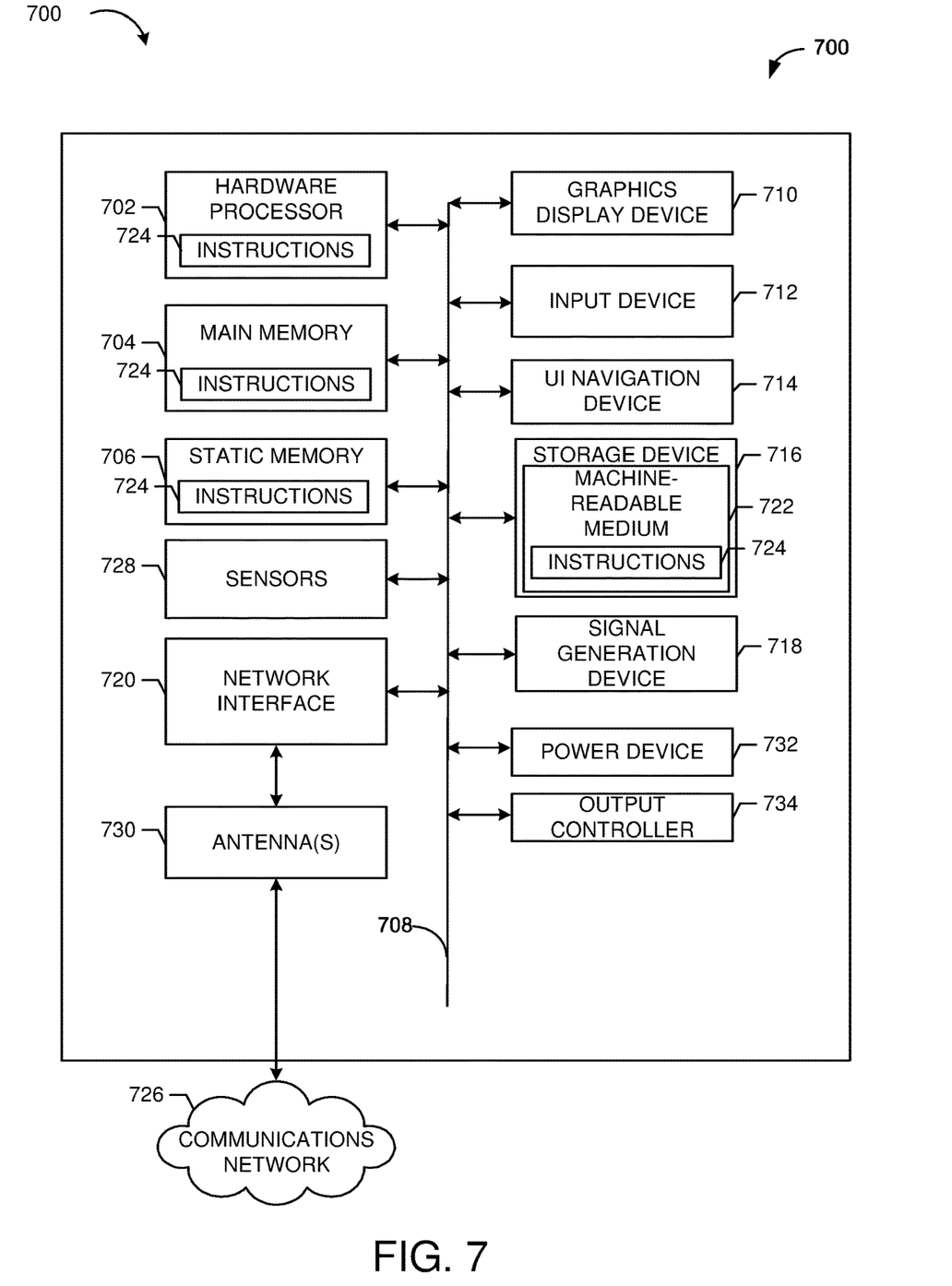
FIG. 7 illustrates a block diagram of an example of a machine or system upon which any one or more of the techniques (e.g., methodologies) discussed herein may be performed.

The machine (e.g., computer system) 700 may include any combination of the illustrated components. For example, the machine 700 may include a hardware processor 702 (e.g., a central processing unit (CPU), a graphics processing unit (GPU), a tensor processing unit (TPU) including an artificial intelligence application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a data signal), a network interface device/transceiver 720 coupled to antenna(s) 730, and one or more sensors 728, such as a sound detecting sensor (e.g., a microphone), accelerometers, magnetometers, location sensors, and the like. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth☐, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
   a telltale embedded in a rear region of the vehicle that is visible from at least one rear passenger seat of the vehicle;
   an activation mechanism; and
   a controller system comprising one or more processors and memory storing executable instructions that, as a result of execution by the one or more processors, causes the controller system to:
      determine that a first user has engaged the activation mechanism to provide a first user input associated with activating the telltale;
      submit, based on the first user input, a command to activate the telltale to attract attention of a second user in the rear passenger seat of the vehicle;
      instruct the telltale to output an optical signal for a fixed duration of time, wherein the optical signal is pulsed at a fixed frequency; and
      instruct, upon passage of the fixed duration of time, the telltale to discontinue outputting the optical signal absent a determination that the first user has engaged the activation mechanism to provide a second user input associated with continuing activation of the telltale.

2. The vehicle of claim 1, wherein the activation mechanism comprises a human-machine interface (HMI) with a touchscreen.

3. The vehicle of claim 2, where the controller system is further configured to:
   present the first user with a graphical user interface (GUI) with an edge bar using the HMI; and
   determine that the first user has selected, based on one or more touch-based interactions with the touchscreen, a telltale activation icon from the edge bar.

4. The vehicle of claim 2, wherein the executable instructions, as a result of execution by the one or more processors, further causes the controller system to:
   present, via the HMI, a prompt indicating that the telltale is activated;
   detect, via the touchscreen, that the first user has tapped the touchscreen subsequent to activation of the telltale; and
   submit a second command to deactivate the telltale.

5. The vehicle of claim 2, wherein the vehicle further comprises additional telltales embedded in other locations of the vehicle, and wherein the HMI provides the first user with an ability to selectively activate each of the telltales.

6. The vehicle of claim 1, wherein the activation mechanism comprises at least one of a microphone for receiving voice-commands, a button on a steering wheel, and a camera to detect hand gestures.

7. The vehicle of claim 1, wherein the telltale is embedded in a rear center console of the vehicle.

8. A method for a telltale in a vehicle, comprising:
   determining, by one or more processors, that a first user of the vehicle has engaged an activation mechanism to provide a first user input associated with activating the telltale embedded in a rear region of the vehicle, wherein the telltale is visible from at least one rear passenger seat of the vehicle;
   submitting, by the one or more processors and based on the first user input, a command to activate the telltale to attract attention of at least one second user located at the at least one rear passenger seat of the vehicle;
   causing, by the one or more processors, the telltale to output an optical signal for a fixed duration of time, wherein the optical signal is pulsed at a fixed frequency; and
   causing, by the one or more processors and upon passage of the fixed duration of time, the telltale to discontinue outputting the optical signal absent a determination that the first user has engaged the activation mechanism to provide a second user input associated with continuing activation of the telltale.

9. The method of claim 8, further including presenting, by one or more processors, a graphical interface to the first user of the vehicle using a human-machine interface (HMI) accessible to the first user of the vehicle, wherein the activation mechanism comprises an edge bar of the graphical interface.

10. The method of claim 9, wherein determining that the first user has engaged the activation mechanism to provide the first user input comprises:
    detecting, by the one or more processors, a swipe gesture from the edge bar of the graphical interface inward;
    presenting, by the one or more processors, an expanded edge bar that comprises a telltale activation icon; and
    detecting, by the one or more processors, a gesture directed to the telltale activation icon.

11. The method of claim 8, wherein the telltale is embedded in a rear center console of the vehicle.

12. The method of claim 8, wherein the vehicle further comprises additional telltales embedded in other locations of the vehicle and a graphical interface that provides the first user with an ability to selectively activate each of the additional telltales.

13. A non-transitory computer-readable storage medium storing executable instructions that, as a result of being executed by one or more processors of a controller system of a vehicle, cause the controller system to at least:
    determine that a first user has engaged an activation mechanism to provide a first user input associated with activating a telltale embedded in a rear region of the vehicle, wherein the telltale is visible from at least one rear passenger seat of the vehicle;
    submit, based on the first user input, a command to activate the telltale to attract attention of at least one second user located at the at least one rear passenger seat of the vehicle;
    cause the telltale to output an optical signal for a fixed duration of time, wherein the optical signal is pulsed at a fixed frequency; and
    cause, upon passage of the fixed duration of time, the telltale to discontinue outputting the optical signal absent a determination that the first user has engaged the activation mechanism to provide a second user input associated with continuing activation of the telltale.

14. The non-transitory computer-readable storage medium of claim 13, wherein the executable instructions, as a result of execution by the one or more processors, further causes the controller system to:

present a graphical interface to the first user using a human-machine interface (HMI) accessible to the first user of the vehicle, wherein the activation mechanism comprises an edge bar of the graphical interface.

15. The non-transitory computer-readable storage medium of claim 14, wherein the first user accesses the edge bar by a swipe gesture from an edge of the graphical interface inward.

16. The non-transitory computer-readable storage medium of claim 14, wherein the executable instructions, as a result of execution by the one or more processors, further causes the controller system to:

present, via the graphical interface, a prompt indicating that the telltale is activated;
detect, via the HMI, that the first user has tapped the HMI subsequent to activation of the telltale; and
submit a second command to deactivate the telltale.

17. The non-transitory computer-readable storage medium of claim 13, wherein the telltale is embedded in a rear center console of the vehicle.

\* \* \* \* \*